(12) United States Patent
Lalande et al.

(10) Patent No.: US 8,034,273 B2
(45) Date of Patent: Oct. 11, 2011

(54) METHOD OF PRODUCING A FIBROUS LAYER FOR THE MANUFACTURE OF A PREFORM OF A COMPOSITE PART

(75) Inventors: Joëlle Lalande, Bordeaux Cauderan (FR); Frédéric Ballion, Bordeaux (FR); Dirk Feltin, Dreden (DE)

(73) Assignee: SNECMA Propulsion Solide, Le Haillan (FR)

( * ) Notice: Subject to any disclaimer, the term of this patent is extended or adjusted under 35 U.S.C. 154(b) by 250 days.

(21) Appl. No.: 12/298,249

(22) PCT Filed: Apr. 25, 2007

(86) PCT No.: PCT/FR2007/051167
§ 371 (c)(1),
(2), (4) Date: Oct. 23, 2008

(87) PCT Pub. No.: WO2007/125249
PCT Pub. Date: Nov. 8, 2007

(65) Prior Publication Data
US 2009/0098331 A1  Apr. 16, 2009

(30) Foreign Application Priority Data
Apr. 26, 2006 (FR) .................................... 06 51474

(51) Int. Cl.
*B29C 45/02* (2006.01)
*B29C 69/00* (2006.01)
(52) U.S. Cl. ........................................ 264/257; 264/255
(58) Field of Classification Search .................. 112/439, 112/475.09; 264/255, 257, 258
See application file for complete search history.

(56) References Cited

U.S. PATENT DOCUMENTS

| 3,991,248 | A | * | 11/1976 | Bauer | 442/148 |
| 4,254,599 | A | * | 3/1981 | Maistre | 52/649.1 |
| 5,399,309 | A | | 3/1995 | Simmons | |
| 7,943,076 | B1 | * | 5/2011 | Hawkins et al. | 264/258 |
| 2003/0080248 | A1 | * | 5/2003 | Morgan | 244/118.5 |
| 2003/0178738 | A1 | * | 9/2003 | Staub et al. | 264/103 |
| 2003/0222371 | A1 | * | 12/2003 | Edelmann et al. | 264/103 |
| 2004/0074589 | A1 | | 4/2004 | Gessler et al. | |
| 2006/0068150 | A1 | * | 3/2006 | Henrich et al. | 428/64.1 |
| 2008/0163976 | A1 | * | 7/2008 | Lalande et al. | 156/148 |

FOREIGN PATENT DOCUMENTS

| EP | 0 337 648 A2 | 10/1989 |
| EP | 0 721 835 A2 | 7/1996 |
| EP | 1 584 462 A2 | 12/2005 |
| WO | WO 03/100148 | 12/2003 |
| WO | WO 03104674 A1 * | 12/2003 |

* cited by examiner

*Primary Examiner* — Joseph S. Del Sole
*Assistant Examiner* — Ryan Ochylski
(74) *Attorney, Agent, or Firm* — Weingarten, Schurgin, Gagnebin & Lebovici LLP

(57) ABSTRACT

The invention provides a method of making a fiber ply for forming a preform of a composite part in the form of a body of revolution having a non-developable surface, the method being characterized in that it comprises the steps consisting in:
  defining an annular space (23) with first and second canvases (20, 21) respectively defining an inner periphery and an outer periphery thereof;
  placing fibers between the canvases (20, 21) by placing the fibers in the annular space in at least one direction and by holding said fibers on the canvases by stitching;
  implementing circular connection stitching in the vicinity of the inner periphery of the annular space (23); and
  cutting out the fiber ply as made in this way in the annular space (23) in order to extract it from the canvases.

24 Claims, 13 Drawing Sheets

METHOD OF PRODUCING A FIBROUS LAYER FOR THE MANUFACTURE OF A PREFORM OF A COMPOSITE PART

This application is a §371 national phase filing of PCT/FR2007/051167, filed Apr. 25, 2007, and claims priority to French Patent Application No. 0651474, filed Apr. 26, 2006.

BACKGROUND OF THE INVENTION

The invention relates to making fiber plies for fabricating fiber preforms for composite parts that include fiber reinforcement and that present the shape of a body of revolution with a non-developable surface, such as for example the surfaces of rings or of a truncated spheres.

A particular field of application for the invention lies in making fiber reinforcements used in fabricating composite strength members for flexible abutments. Flexible abutments are commonly used in the field of propulsion to form hinges between a nozzle and the body of a thruster. Such abutments are formed by alternating rigid composite strength members, each in the form of a spherical ring, and layers of elastically deformable material such as an elastomer.

A method presently used for forming such composite strength members consists in draping and molding plies of carbon fabric preimpregnated with a resin (e.g. an epoxy resin). More precisely, the method comprises the following steps:

cutting out plies from a preimpregnated fabric of carbon fibers or glass fibers, the plies being in the form of annular sectors of a shape that is approximately that of the development of a truncated cone;

draping plies of preimpregnated fabric in a rosette pattern on a male mold element having a surface in the form of a spherical ring corresponding to the inner surface of the spherical strength member to be made, compacting the plies in a vacuum by means of a membrane, putting a female mold element into place having a surface in the form of a spherical ring corresponding to the outer surface of the strength member to be made; and polymerizing the assembly under pressure, and unmolding the strength member.

A rigid part with fiber reinforcement is thus obtained that provides better strength in the face of mechanical stresses.

Nevertheless, the above method is very difficult to implement. Draping fiber plies so as to form the fiber reinforcement is an operation that is manual and that is performed directly on a shaping support, thus preventing any accurate control over the orientation and the quantity of fibers at all points of the reinforcement. Putting the female mold element into place can lead to plies slipping and also to wrinkles being formed.

Consequently, that technique does not provide good reproducibility between parts, which parts can then present mechanical characteristics that differ, in particular in terms of fiber concentration and fiber orientation.

When making a laminated flexible abutment, it is important for all of the strength members of the abutment to present shapes and mechanical characteristics that are similar, in order to ensure that the abutment behaves properly.

Furthermore, the plies are formed using preimpregnated fibers that present less flexibility than do dry fibers, thereby making it much more difficult to shape the plies to match the shape of a non-developable body of revolution.

Naturally, other types of composite parts also exist (e.g. engine casings) that present shapes comprising bodies of revolution with non-developable surfaces and that are made up of fiber reinforcement with fibers that are oriented as a function of mechanical forces so as to increase the mechanical strength of the part. Nevertheless, as with a strength member for a flexible abutment, there is no method available enabling fiber layers to be made repeatedly that present fibers in quantities and orientations that are constant so as to form fiber reinforcements with shapes in the form of bodies of non-developable revolution and with geometrical characteristics that are uniform.

Furthermore, certain types of part also need to be reinforced locally. For this purpose, the fiber reinforcement must present increased thickness of fibers in determined locations. Making fiber layers with thicker fiber portions suitable for deforming and matching the shapes of non-developable bodies of revolution becomes even more difficult, in particular in terms of controlling the orientation of the fibers and in terms of reproducibility between layers.

OBJECT AND BRIEF DESCRIPTION OF THE INVENTION

An object of the present invention is to remedy the drawbacks of prior art methods by proposing a method that makes it possible to make fiber plies that are suitable for making preforms or fiber reinforcements having shapes in the form of bodies with non-developable surfaces, and in which the quantities and orientations of the fibers can be controlled in a manner that is accurate and reproducible.

This object is achieved by a method of making a fiber ply for forming a preform for a part in the shape of a body of revolution with a non-developable surface, the method comprising the steps consisting in:

defining an annular space with first and second canvases respectively defining an inner periphery and an outer periphery thereof;

placing fibers between the canvases by placing the fibers in the annular space in at least one direction and by holding said fibers on the canvases by stitching;

implementing circular connection stitching in the vicinity of the inner periphery of the annular space; and cutting out the fiber ply as made in this way in the annular space in order to extract it from the canvases.

By means of the method of the invention, the fiber ply that is to form a preform in the shape of a body of revolution with a non-developable surface is itself made flat between two canvases. Consequently, the orientation of its fibers can be controlled accurately and can enable parts to be made that are particularly well suited to the mechanical stresses to which they are to be subjected. The fiber ply of the invention is preferably made by using an automatic embroidery machine for placing the fibers between the two canvases. It is thus possible to automate the placing of the fibers and to form fiber plies that are identical concerning the orientation and the quantities of fibers used.

In an aspect of the invention, additional fibers are added to fill in the empty gaps present between the fibers placed between the two canvases, the additional fibers being secured to the adjacent fibers by stitching. This ensures that the concentration of fibers is constant over the entire fiber ply, thereby enabling preforms or fiber reinforcements to be obtained that have geometrical characteristics that are uniform.

In particular, the fibers may be carbon fibers or glass fibers.

The present invention also provides a method of fabricating fiber reinforcement for a composite strength member of a flexible abutment, the method comprising forming a preform by alternating at least two fiber plies, in which method, the first ply is made in application of the above-described method of making a fiber ply for forming a part having the shape of a body of revolution with a non-developable surface. The second ply is made by placing a ply on the first ply that is held in shape on a spherical tool, the second ply comprising fibers that are oriented perpendicularly to the fibers of the first ply.

Thus, the method of the invention for fabricating a fiber ply makes it possible to fabricate a fiber reinforcement for a strength member of a flexible abutment that is particularly well adapted to the mechanical requirements for the strength member. The strength member needs to present good strength in two perpendicular directions, one corresponding to the axis of the strength member and the other perpendicular thereto. For this purpose, the reinforcement of the strength member is made up by alternating plies having fibers that are oriented successively in one or the other of these two directions. By means of the method of the invention, the ply that is the most difficult to make, i.e. the ply having fibers that are oriented along the axis of the strength member, can itself be made while flat between the two canvases, thus enabling the orientation and the quantity of fibers to be controlled accurately and reproducibility for each ply and enabling fiber reinforcement to be obtained that is uniform and adapted to the mechanical stresses. The ply as made in this way can easily be put into place on a spherical tool while conserving the orientation of the fibers. It is then possible to make the fiber reinforcement while the fibers are dry (i.e. without any pre-impregnated fibers) and that already presents the shape of the strength member that is to be made, i.e. the shape of a body of revolution having a non-developable surface.

In an aspect of the invention, the second ply is made by filamentary winding on the first ply.

Once the fiber reinforcement has been made, it is placed in a mold into which a thermosetting resin is injected under pressure, the resin subsequently being polymerized by heat treatment. A rigid composite strength member is thus obtained that includes fiber reinforcement that is structurally adapted to withstand the mechanical forces to which the strength member is to subjected and that presents practically no porosity.

The invention also provides a method of fabricating a flexible abutment, the method consisting in forming a laminated structure made up of a plurality of rigid composite strength members interleaved with layers of elastically deformable material, each strength member being made in application of the method of fabricating a strength member as described above.

In a particular aspect, the method of fabricating a flexible abutment comprises the steps consisting in:
  making a plurality of fiber reinforcements of increasing size in application of the above-described method;
  holding the reinforcements in one another by means of spacers between adjacent strength members, said spacers defining the thicknesses of the layers of elastically deformable material;
  injecting a thermosetting resin under pressure into the reinforcements;
  applying heat treatment to polymerize the resin in each reinforcement so as to form a plurality of rigid composite strength members;
  removing the spacers; and
  injecting or casting an elastic material into the spaces present between the rigid composite strength members in order to form layers of elastic material between them.

This implementation of the method enables the resin to be injected and polymerized simultaneously into the fiber reinforcement and then makes it possible to form the layers of elastic material between the various strength members made in this way.

The present invention also provides a method of fabricating a composite part of the casing type, the method comprising forming a fiber preform or reinforcement made up of at least one ply of fibers that is made in application of the above-described method of making a fiber ply for forming a preform of a part in the form of a body of revolution with a non-developable surface. The fiber ply is made up of fibers oriented in two different directions.

In an aspect of the invention, one or more thickener portions are formed at determined locations on each fiber ply, said portions being made by repeatedly placing fibers at determined locations on the ply. It is thus possible to fabricate parts having local reinforcements that are made directly on the fiber ply and in which it is easy to control the thickness and the orientation of the fibers, in a manner that is reproducible for each ply.

BRIEF DESCRIPTION OF THE DRAWINGS

Other characteristics and advantages of the invention appear from the following description of particular embodiments of the invention given as non-limiting examples and with reference to the accompanying drawings, in which.

DETAILED DESCRIPTION OF EMBODIMENTS OF THE INVENTION

The method of the present invention for making a fiber ply can be used in general for fabricating any type of preform for a part that presents the shape of a body of revolution and that has a non-developable surface.

As explained below in detail, the method serves to begin by making a flat fiber ply on canvases, which ply is capable subsequently of adapting to the shape of the body of revolution having a non-developable surface. The ply may be used on its own or it may form part of a stack of a plurality of plies for forming the preform or the fiber reinforcement of the part that is to be fabricated.

Figure 1:
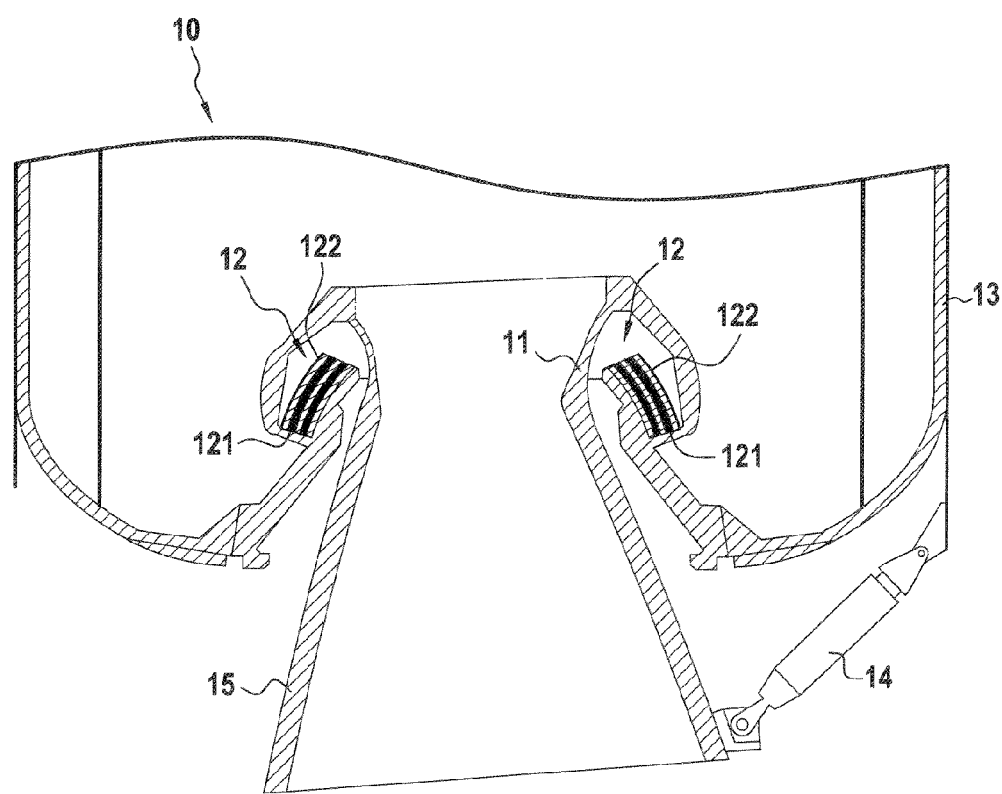
FIG. 1 is a diagrammatic section view of a rear portion of a thruster fitted with a flexible abutment.

In a first implementation, the method of the invention is used for fabricating composite flexible abutment strength members. As shown in FIG. 1, it is common practice to hinge a nozzle 11 of a thruster or rocket engine 10 by means of a flexible abutment 12 comprising a laminated structure made up of alternating layers of elastically deformable material 121 (e.g. of elastomer) and rigid composite strength members 122 presenting the shape of a truncated sphere. The abutment 12 thus forms a flexible connection between the nozzle 11 and the body 13 of the thruster such that the nozzle can be steered by means of an actuator 14 placed between the body 13 of the thruster and the diverging portion 15 of the nozzle.

Fabrication of the strength member consists initially in making fiber reinforcement constituted by an alternating stack of plies having fibers oriented in a first direction corresponding to the axis of the strength member and referred to as "0° plies", and plies in a second direction perpendicular to the axis of the strength member and to the fibers of the 0° plies, and referred to as "90° plies".

The fibers used for making the plies may, in particular, be glass fibers or carbon fibers depending on the desired performance and cost.

Figure 2:
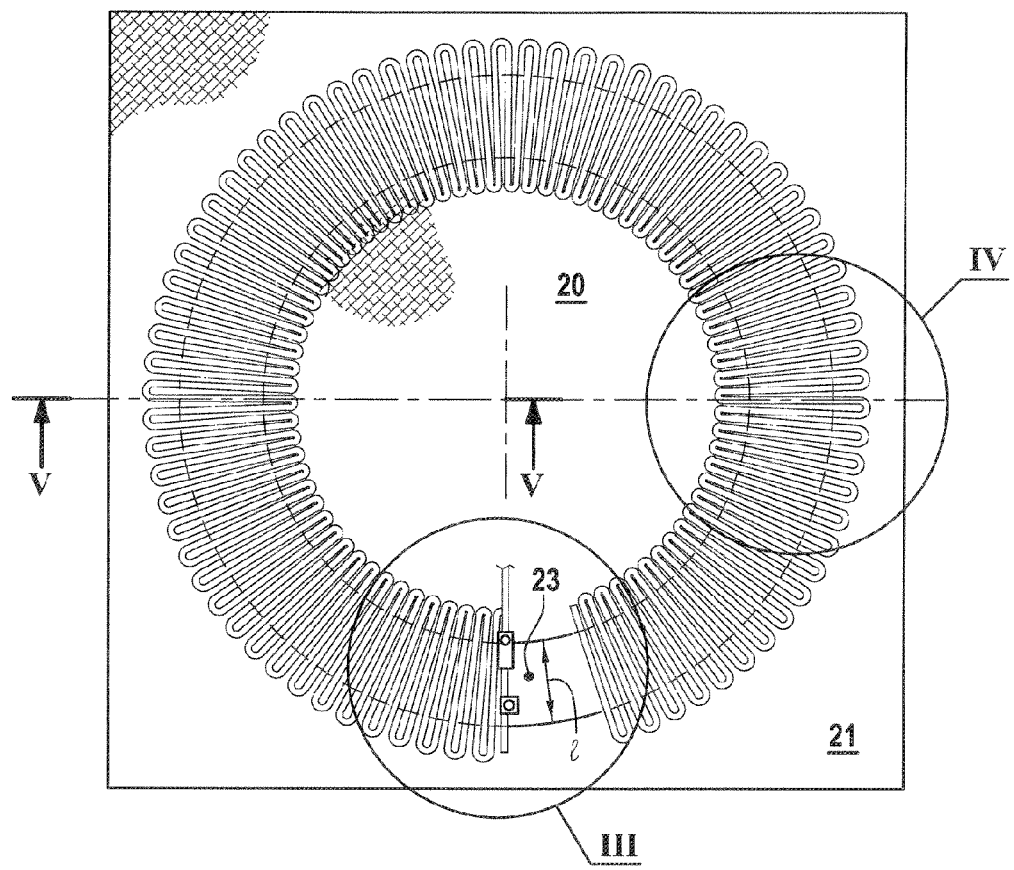
FIG. 2 is a diagrammatic plan view showing how a fiber ply is made in accordance with an implementation of the invention.

The 0° plies are made in accordance with the method of the invention. As shown in FIG. 2, a 0° ply is made starting from two canvases 20 and 21 defining an annular space 23. The canvases 20 and 21 define respectively the inner and outer peripheries of the annular space of width 1 selected to be slightly greater than the dimensions required for the 0° ply.

Fibers 22 are placed radially between the two canvases so as to fill the annular space as well as possible. The fibers 22 are put into place by using tailored fiber placement (TFP) technology. This technology consists in placing fibers in precise locations on a support (canvas) and in securing them by means of an automatic embroidery machine.

Nevertheless, in the present invention, TFP technology is used differently. As described for example in document U.S. 2004/0074589, TFP technology is used for placing and stitching fibers on a support that forms an integral portion of the ply. In contrast, in the present invention, supports (canvases) are used solely for defining the shape and the dimensions of the fiber ply that is to be made. The supports are not to be found in the final fiber ply. If the usual TFP were to be used, then the fiber ply embroidered on the support would be too rigid and could not be deformed to match the three-dimensional shape of the body of revolution with a non-developable surface.

Figure 3:
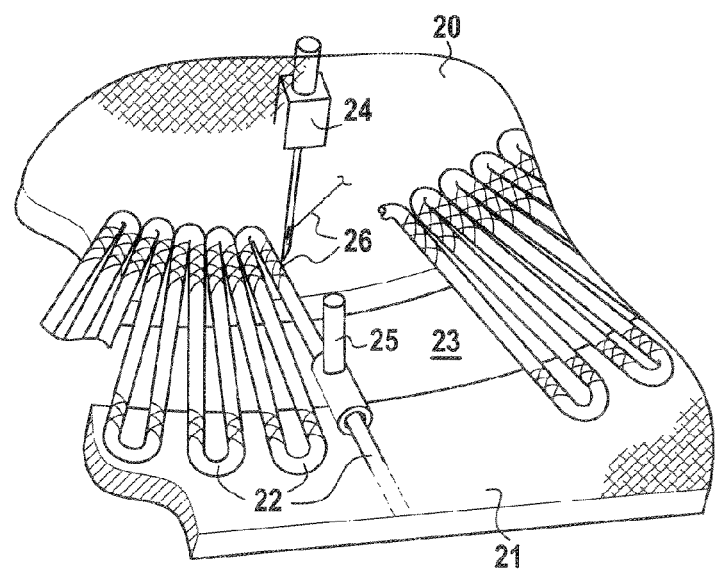
FIG. 3 is an enlarged perspective view of a detail referenced III in FIG. 2 showing how the fibers are positioned and stitched by an automatic embroidery machine.

More precisely, and as shown in FIG. 3, the machine delivers the fibers from a reel (not shown) e.g. containing glass rovings, and it positions them by means of a guide 25 in the annular space 23. To hold the fibers as put into place in this way, the machine has a stitching head 24 that stitches the fibers at their ends to the canvases 20 and 21 with a thread 26 that is very fine, e.g. a polyethylene or polyester thread. The placing and the stitching of the fibers are programmed in the numerical control of the machine.

Figure 4:
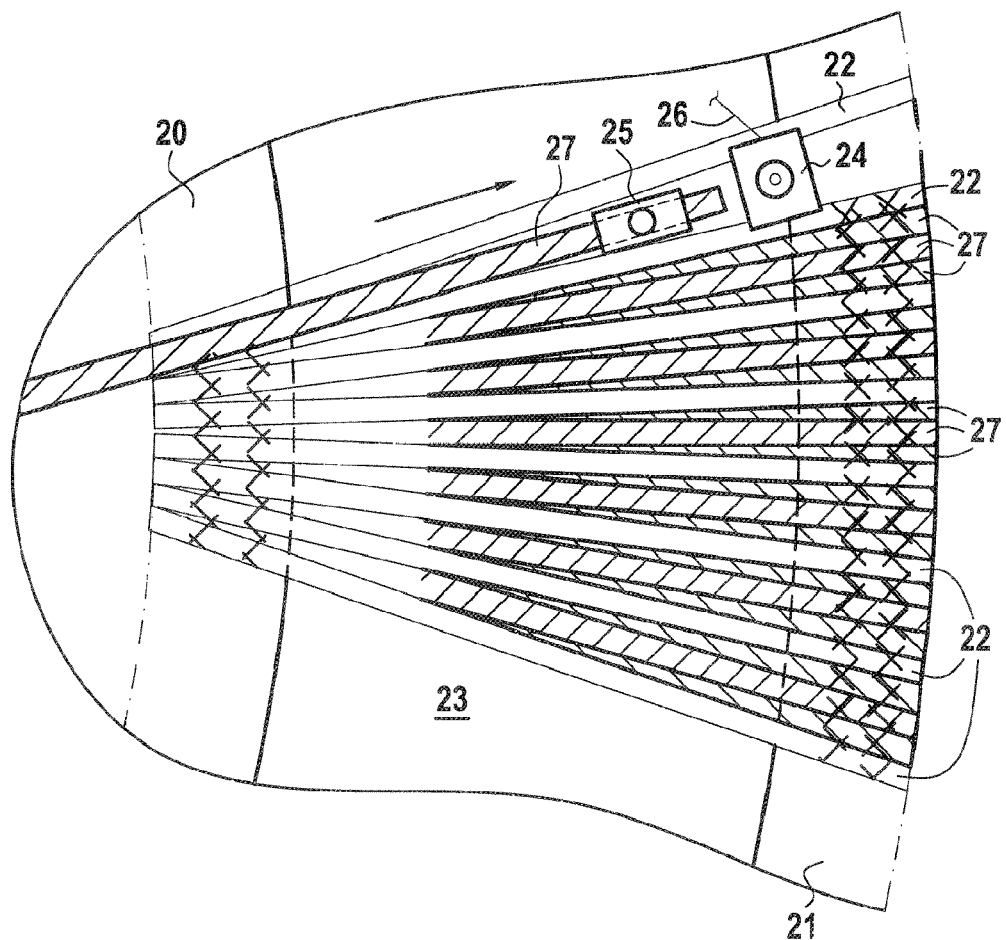
FIG. 4 is an enlarged view of a detail referenced IV of the FIG. 2 ply having additional fibers placed and stitched thereon by an automatic embroidery machine.

Given the annular shape of the space 23 and the radial placing of the fibers therein, gaps remain between the fibers that have been put into place by the machine, and these gaps increase in size on approaching the outer periphery of the annular shape. In order to maintain an identical concentration of fibers at all points of the ply, additional fibers 27 of varying lengths are added in the gaps left between the fibers 22, as shown in FIG. 4. Under such circumstances, the automatic embroidery machine is programmed to fill in the empty gaps between the fibers 22 by putting the additional fibers 27 into these gaps and by stitching them to the adjacent fibers.

Figure 5:
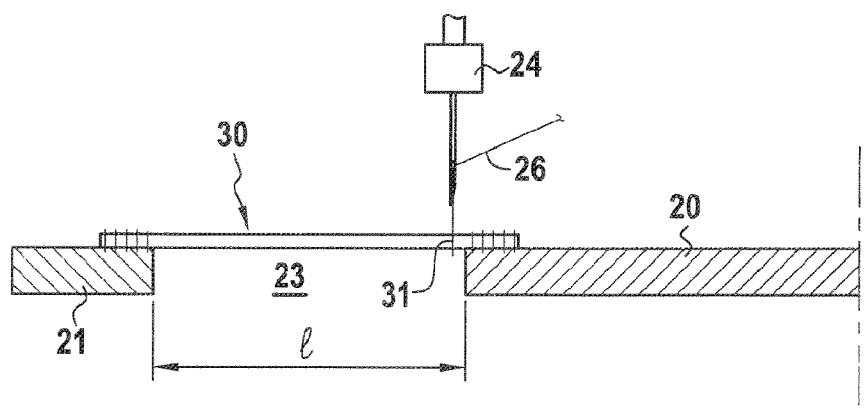
FIG. 5 is a half-section view seen on arrows V showing the fiber ply of FIG. 2 with a circular stitch being made thereon.
Figure 6:
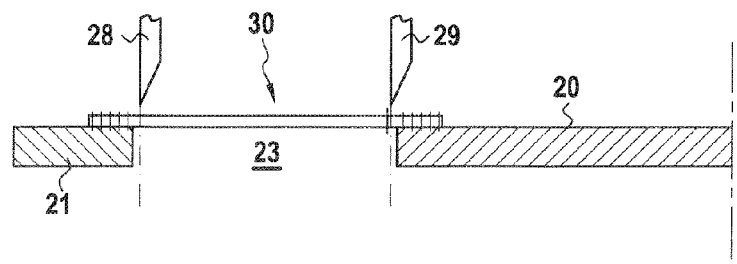
FIG. 6 is a half-section view, on arrows V of the FIG. 2 fiber ply showing removal of the pieces of canvases from the ply.

Once all of the gaps have been filled in, the annular space 23 is filled by a ply 30 containing fibers at a concentration that is constant throughout. Circular stitching 31 is then performed (cf. FIG. 5) in the vicinity of the inner periphery of the annular space in order to hold the fibers before it is possible to remove the fiber ply 30 from the canvases, e.g. by cutting through the ply 30 along the inner and outer peripheries of the annular space 23 using cutting tools 28 and 29 (e.g. knives, electric scalpels, jets of water under pressure, lasers, etc.) (FIG. 6).

Figure 7:
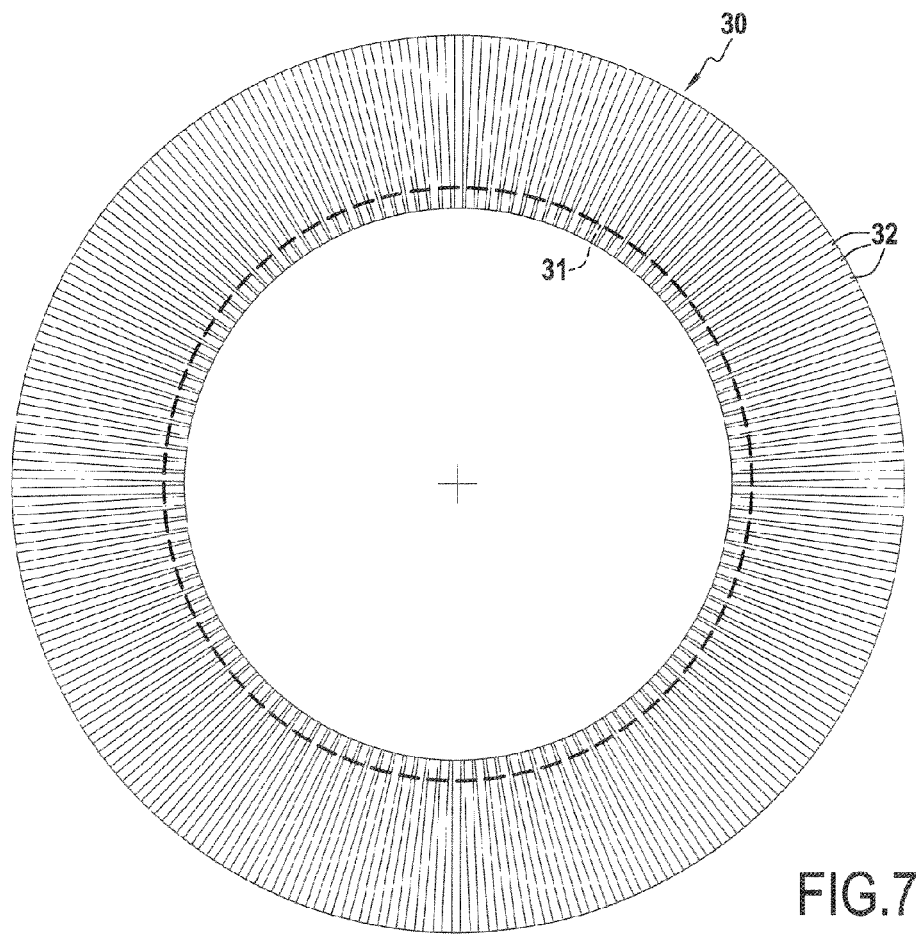
FIG. 7 is a diagrammatic plan view showing the FIG. 2 fiber ply after additional fibers have been added and the canvases removed.

FIG. 7 shows the fiber ply 30 after removal from the canvases. This produces a fiber ply in which the fibers 22 are held to one another by the circular stitching 31, while conserving a high degree of flexibility making it easy to shape on a shaper tool.

Figure 8:
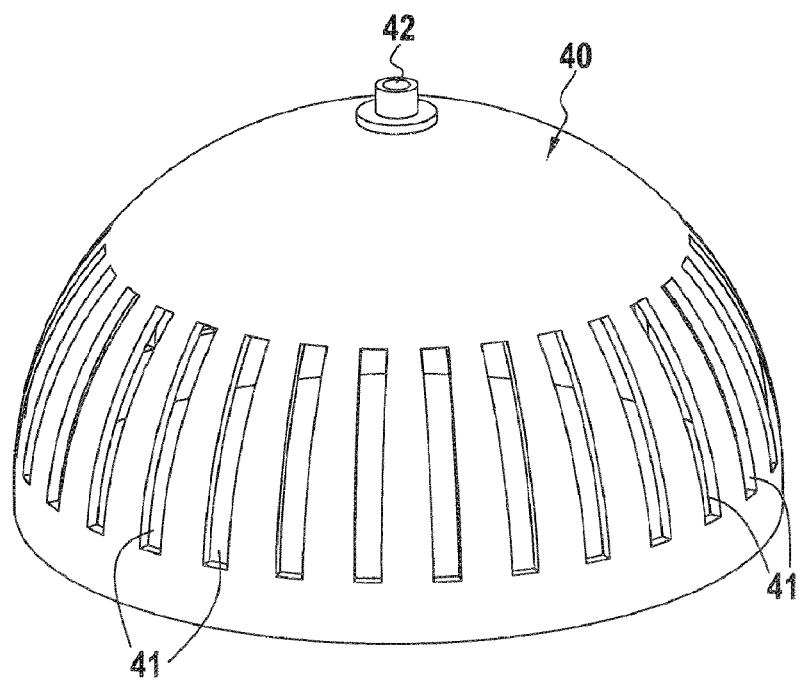
FIG. 8 is a diagrammatic perspective view of a shaping tool used for fabricating a fiber reinforcement in accordance with an embodiment of the invention.
Figure 9:
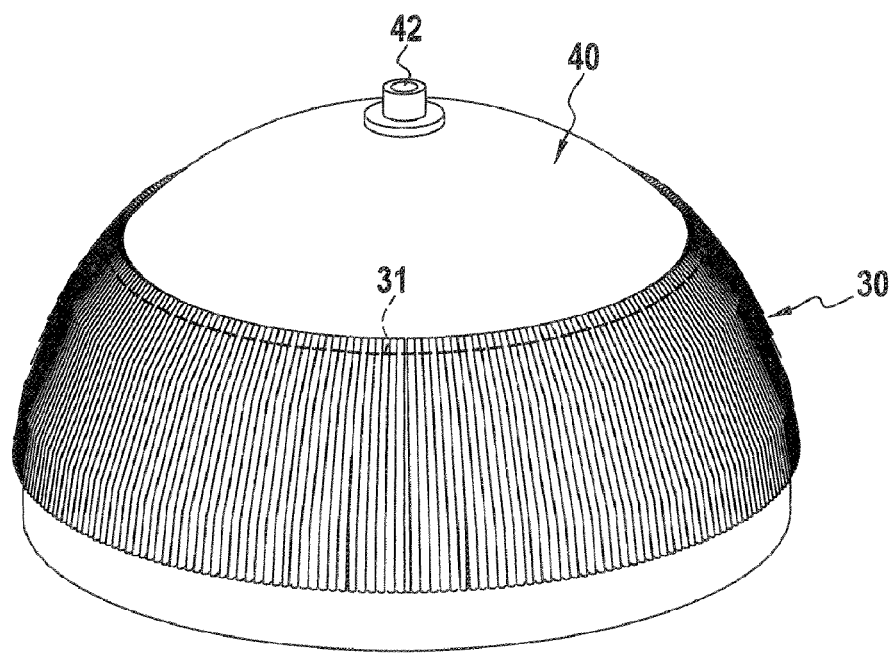
FIG. 9 is a diagrammatic perspective view of the FIG. 8 tool with the FIG. 7 fiber ply placed thereon.
Figure 10:
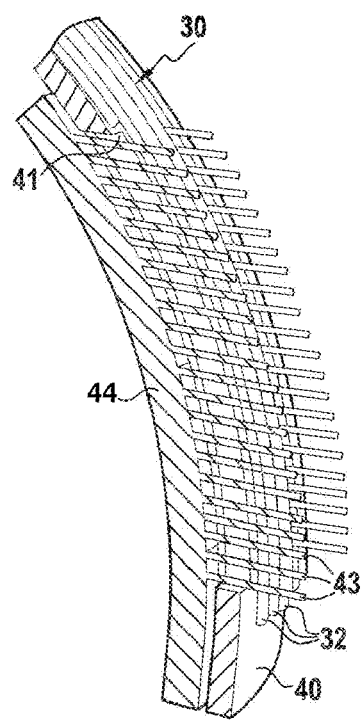
FIG. 10 is a diagrammatic detail view showing how strips of pins are positioned in the FIG. 9 tool.

FIG. 8 shows an example of such a tool that can be used for making an alternating stack of 0° plies and of 90° plies. The tool 40 is hemispherical in shape with slots 41 for passing pins that are used for making the 90° plies. FIG. 9 shows the fiber ply 30 once it has been positioned (i.e. shaped) on the tool 40. Since the fibers 22 are relatively free beside the outer periphery of the ply 30, the ply adapts well to the spherical shape of the tool 40. Thereafter, a strip 44 supporting pins 43 is put into place in each slot 41 of the tooling (FIG. 10).

Figure 11:
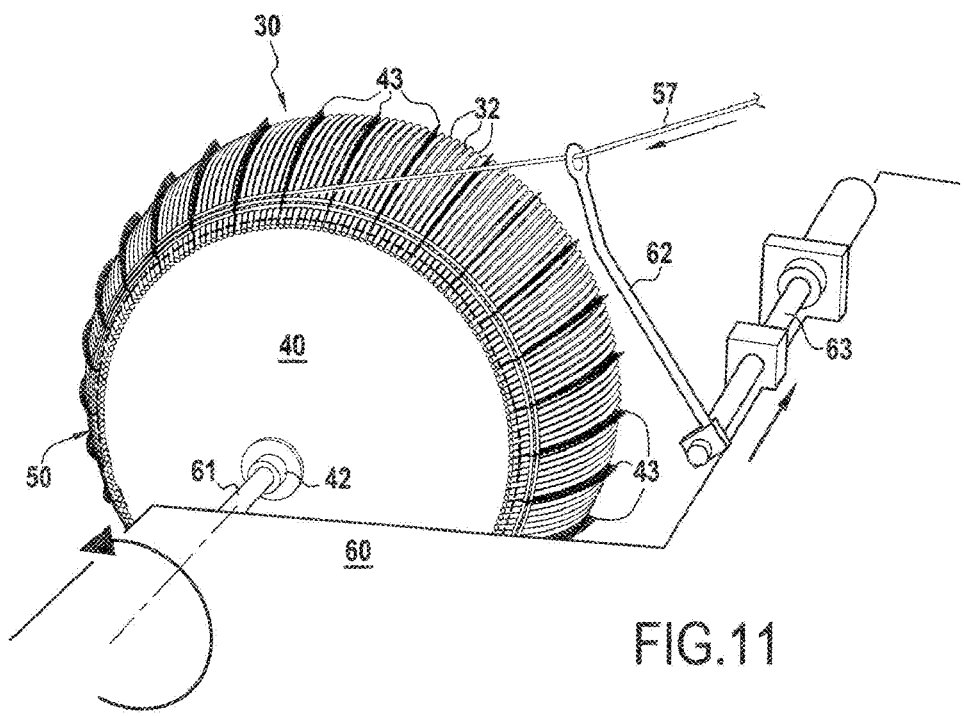
FIG. 11 is a diagrammatic perspective view showing a filamentary winding installation.

A 90° ply 50 is then made directly on the 0° layer constituted by the fiber ply 30, the 90° ply being made by filamentary winding (FIG. 11). For this purpose, the top 42 of the tool 40 is secured to a mandrel 61 of a winding machining 60. The machine 60 then rotates the tool 40 while continuously delivering a yarn 57 by means of a threading eye 62 mounted on an arm 63 that is moved as winding progresses so as to form on the ply 30 successive loops that are held between the pins 43. The yarn 57 is preferably constituted of the same material (e.g. glass fibers or carbon fibers) as that constituting the fibers 32 of the fiber ply 30.

Figure 12:
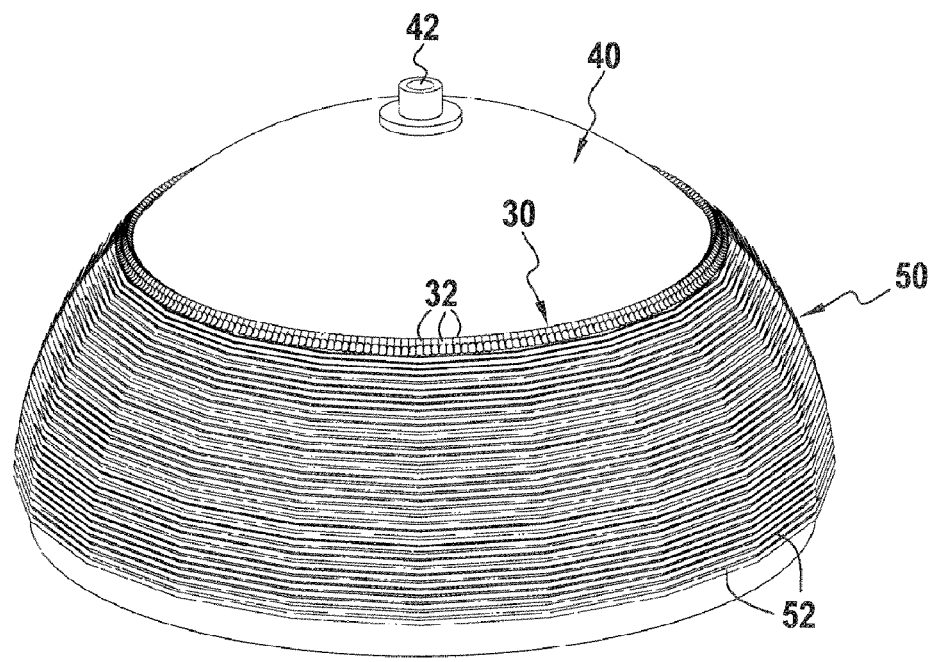
FIG. 12 is a diagrammatic perspective view of the FIG. 9 tool further including a ply of filamentary winding on the fiber ply.

Once winding has terminated, the fiber ply 30 at 0° is completely covered by a fiber ply 50 at 90° (FIG. 12), i.e. a ply in which the fibers 52 are oriented perpendicularly to the fibers 32 of the underlying ply 30.

The fiber reinforcement or preform for the flexible abutment strength member is thus made by alternating, on the tool 40, 0° fiber plies 30 with 90° fiber plies 50 that are made by winding. Each 0° ply is made using the above-described method, possibly while slightly increasing on each occasion the width of the layer 30 so as to take account of the increase in volume in the stack.

By way of example, for a strength member having a thickness of 3 millimeters (mm) with fibers at a volume density of 50%, the following stack is made:
- one 0.35 mm thick 0° ply by TFP placement;
- one 0.53 mm thick 90° ply by filamentary winding;
- one 0.35 mm thick 0° ply by TFP placement;
- one 0.53 mm thick 90° ply by filamentary winding;
- one 0.35 mm thick 0° ply by TFP placement;
- one 0.53 mm thick 90° ply by filamentary winding; and
- one 0.35 mm thick 0° ply by TFP placement.

Once the stack has been made (FIG. 13), fiber reinforcement 80 is available made up of dry fibers that are oriented in alternation in two perpendicular directions, here corresponding to the directions in which mechanical stresses will be applied to the abutment.

Figure 13:
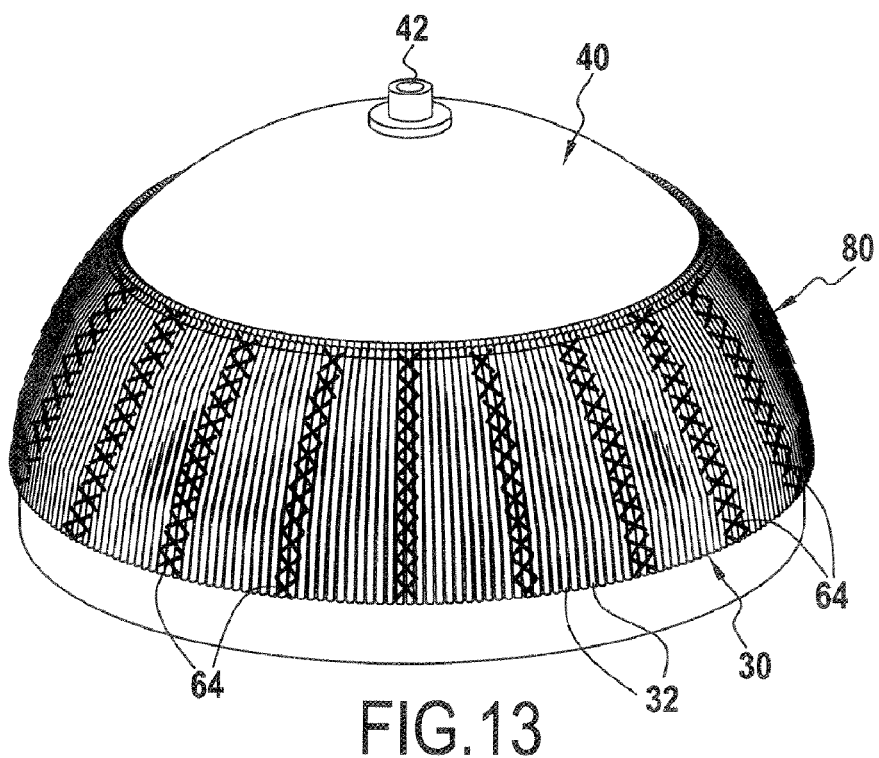
FIG. 13 shows fiber reinforcement formed by superposing alternating plies comprising fiber plies as shown in FIG. 7 and filamentary winding plies.

The 0° and 90° plies present in the stack may be bonded together by means of threads 64 passing through the plies in the thickness direction (Z direction) (FIG. 13). These interlayer connections may be made while using the slots 41 in the tool for passing the stitching using the threads 64. By way of example the threads 64 may be made of polyethylene terephthalate (PET), or of carbon.

Figure 14A:
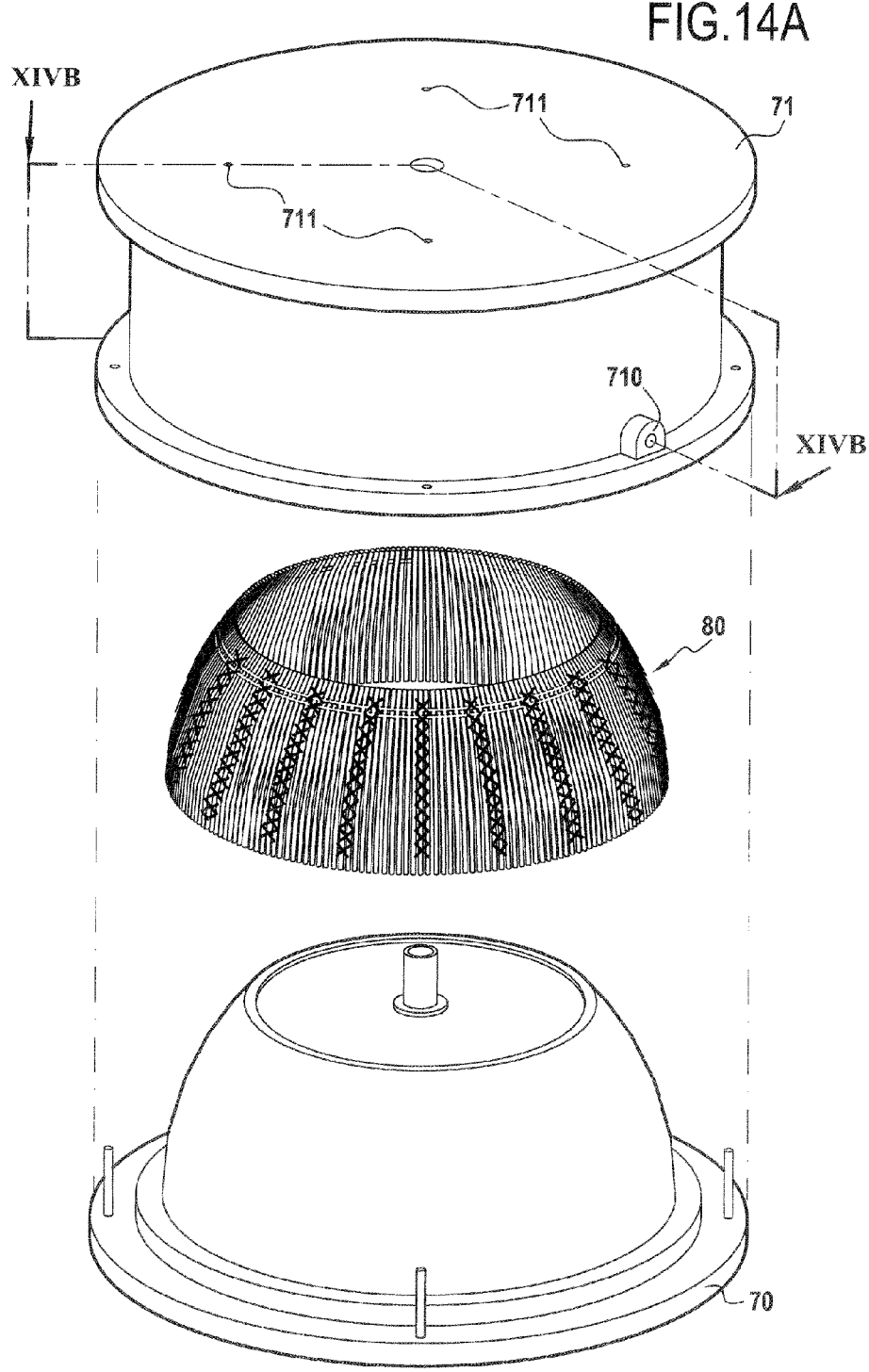
FIG. 14A is a perspective view showing the assembly used for injecting resin into fiber reinforcement.
Figure 14B:
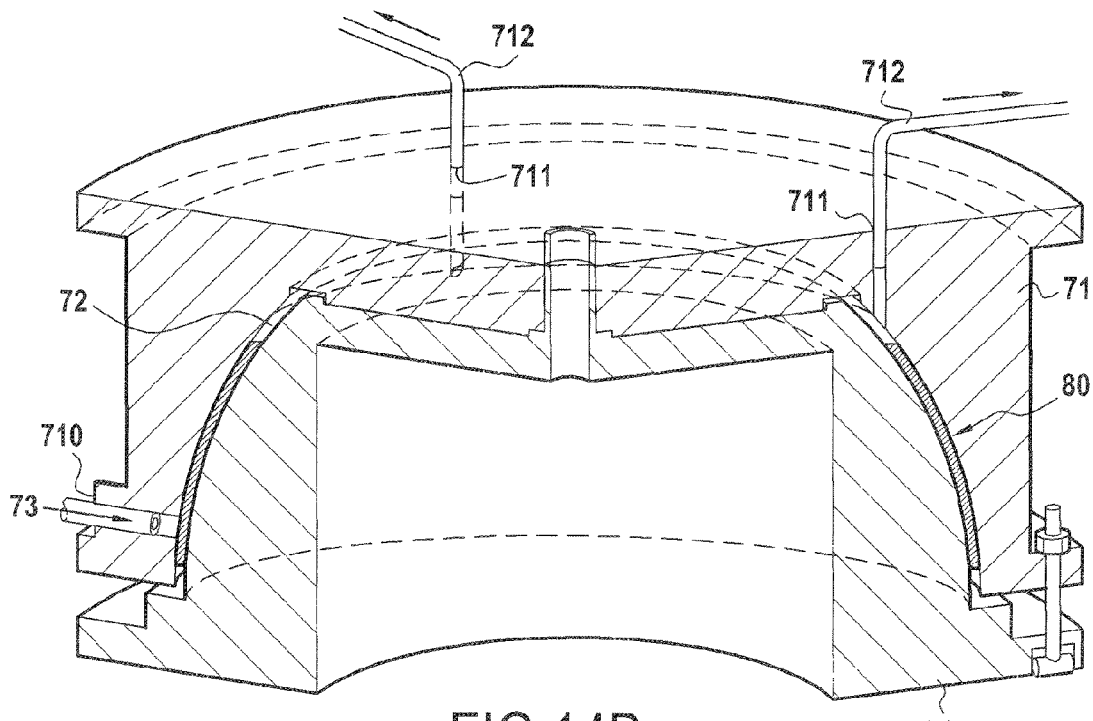
FIG. 14B is a fragmentary diagrammatic view in section showing resin being injected into fiber reinforcement.

Thereafter, the part is molded by impregnating the reinforcement 80 with a thermosetting resin that is caused to polymerize by heat treatment. This is done by means of the well-known resin transfer molding (RTM) method. In the RTM method, the fiber reinforcement 80 is placed between a mold 70 and a counter-mold 71 (FIG. 14A), with the reinforcement being initially positioned on the mold 70. Once the mold and counter-mold 70 and 71 have been assembled together (FIG. 14B) to define an internal space 72 containing the reinforcement 80, a thermosetting resin 73 is injected therein via a feed orifice 710 formed through the bottom portion of the counter-mold 71. The counter-mold 71 also has orifices 711 that are connected to exhaust ducts 712 that are maintained under pressure. This configuration enables a pressure gradient to be established between the bottom of the reinforcement where the resin is injected and the top portion of the reinforcement situated close to the orifices 711. In this way, the thermosetting resin 73 injected substantially via the bottom portion of the reinforcement 80 is caused to impregnate progressively all of the reinforcement by flowing within the space 72 as far as the orifices 711 through which surplus resin is removed.

By way of example, the resin used may be an epoxy resin of the 180° C. temperature class (maximum temperature it can withstand without loss of characteristics). Resins that are suitable for RTM methods are well known. They preferably present low viscosity in order to facilitate injection between the fibers. The treatment class and/or the chemical nature of the resin are selected as a function of the thermomechanical stresses to which the part is to be subjected. Once the resin has been injected throughout the reinforcement, it is polymerized by applying heat treatment in compliance with the RTM method.

After injection and polymerization, the part is unmolded. It may optionally be subjected to a post-baking cycle in order to improve its thermomechanical characteristics (raise its glass transition temperature), e.g. a 2-hour cycle at 180° C. The part is then trimmed to remove excess resin and chamfers are machined thereon. No other machining is needed, given that since the part is molded it complies with the required dimensions.

Figure 15:
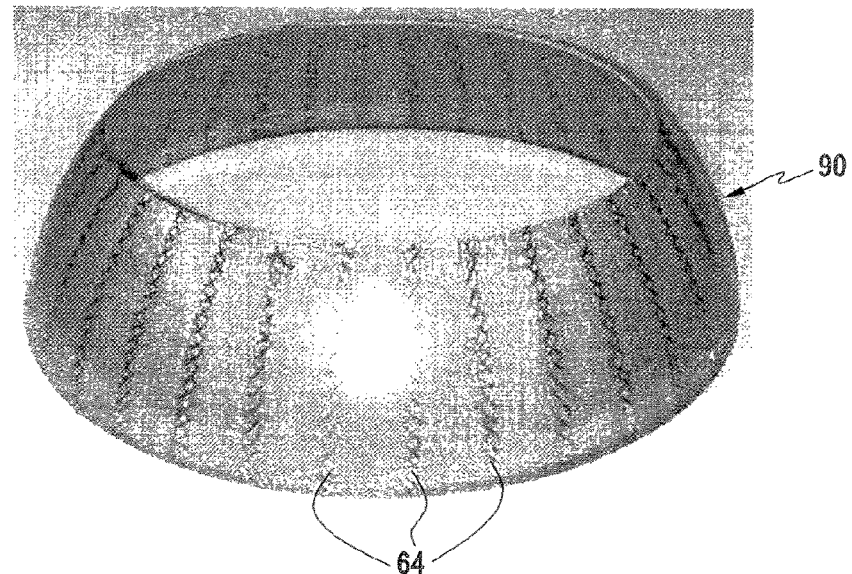
FIG. 15 is a photograph showing an embodiment of a composite flexible abutment strength member made in accordance with the invention.

As shown in FIG. 15, a composite strength member 90 is obtained that is in the form of a truncated sphere.

The flexible abutment is made by forming a laminated structure in which such composite strength members alternate with layers of elastically deformable material (e.g. an elastomer).

The abutment may be made by stacking composite strength members of increasing size and by interposing between successive strength members respective layers of elastically deformable material obtained by draping a non-vulcanized elastomer sheet. The number of strength members and the number of layers of elastic material making up the flexible abutment are determined as a function of the forces to be withstood by the abutment. For example, a flexible abutment may comprise seven strength members and six layers of elastomer material, each interposed between two successive strength members. The assembly comprising the composite strength members and the layers of elastomer material is subsequently subjected to a thermal cycle (e.g. in a stove at 150° C.) in order to vulcanize the elastomer constituting the layers of elastic material.

In a particular embodiment of the flexible abutment, a series (e.g. seven) of interfitting fiber reinforcements (i.e. of increasing or decreasing size) is made using the above-described method. The reinforcements are maintained one within another by metal spacers located between each reinforcement and corresponding to the thickness of the layers of elastically deformable material. The resin is injected into each of the reinforcements and it is polymerized using the RTM method. The spacers are removed and the strength members are placed on molds that enable a space to be maintained between successive strength members. The elastomer material is then injected/cast into the spaces formed between the strength members.

The threads 64 providing inter-layer bonding in each of the strength members (FIG. 15) serve to establish thermal conductivity between two strength members, thereby making it easier to deliver heat into the layer of elastically deformable material between two strength members. For example when the elastic layers are made of rubber, the presence of the threads 64 improves the vulcanization thereof by increasing the thermal conductivity between the strength members.

Naturally, the method of the present invention for making a fiber ply is not limited solely to fabricating strength members as described above. It can be used for fabricating any other type of part presenting the shape of a body of revolution and a non-developable surface.

Figure 16:
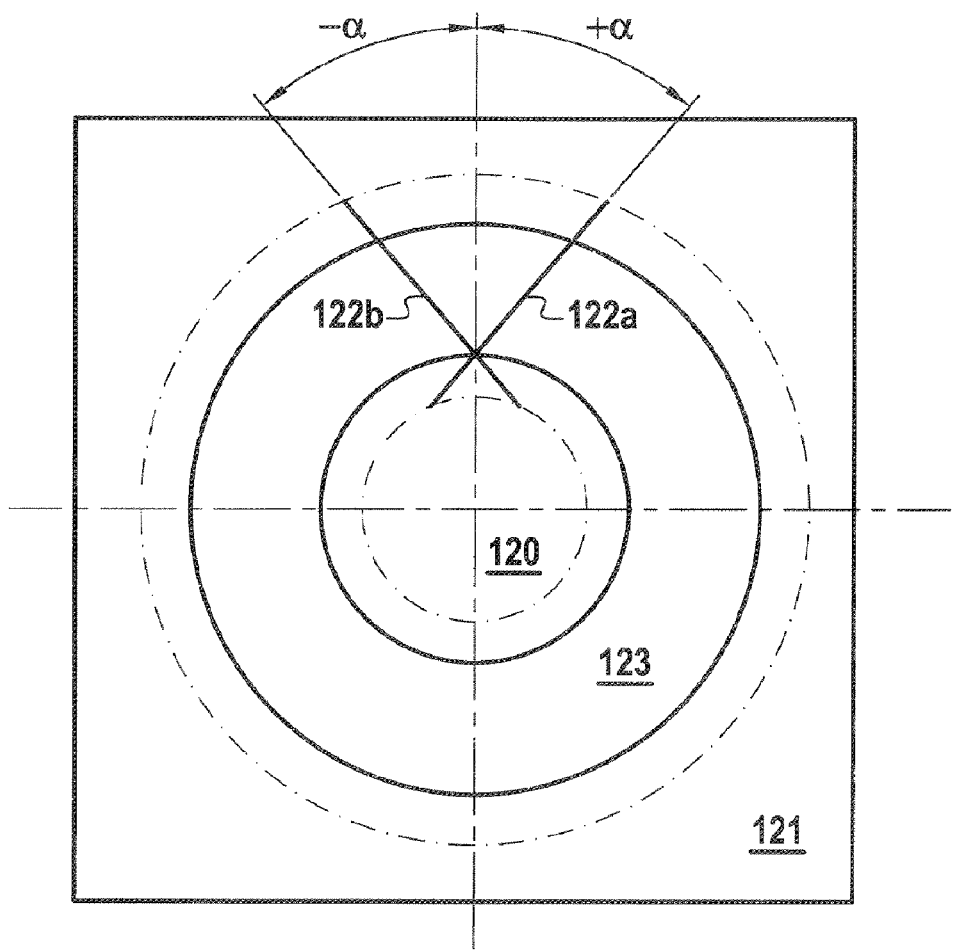
FIG. 16 is a plan view showing how fibers are placed with two distinct orientations in accordance with another implementation of the invention.

FIG. 16 shows another implementation of the method of the invention for fabricating an annular part of a casing. In this implementation, the fiber ply is constituted by a plurality of series of fibers 122a and 122b, e.g. glass fibers or carbon fibers, that are placed respectively in two different orientations corresponding to the directions of the mechanical forces (e.g. in tension and compression) to which the part is to be subjected. This placement of the fibers in two orientations serves to confer on the resulting part the ability to withstand mechanical stresses in different directions.

As explained above, the fiber layer is made from two canvases 120 and 121 that define an annular space 123. The canvases 120 and 121 define respectively the inner periphery and the outer periphery of the annular space, which is of a width that is selected to be slightly greater than the dimensions required for the ply.

The fibers 122a and 122b are put into place using TFP placement technology, i.e. by programming the automatic embroidery machine so that it positions and stitches the fibers 122a and 122b on the canvases respectively at an angle α and at an angle −α (FIG. 16). The angles α and −α may correspond for example respectively to +45° and to −45°. The automatic embroidery machine is implemented in the same manner as described for FIG. 3, with the putting into place and the stitching of the fibers at angles α and −α being programmed in the numerical control of the machine.

Figure 17A:
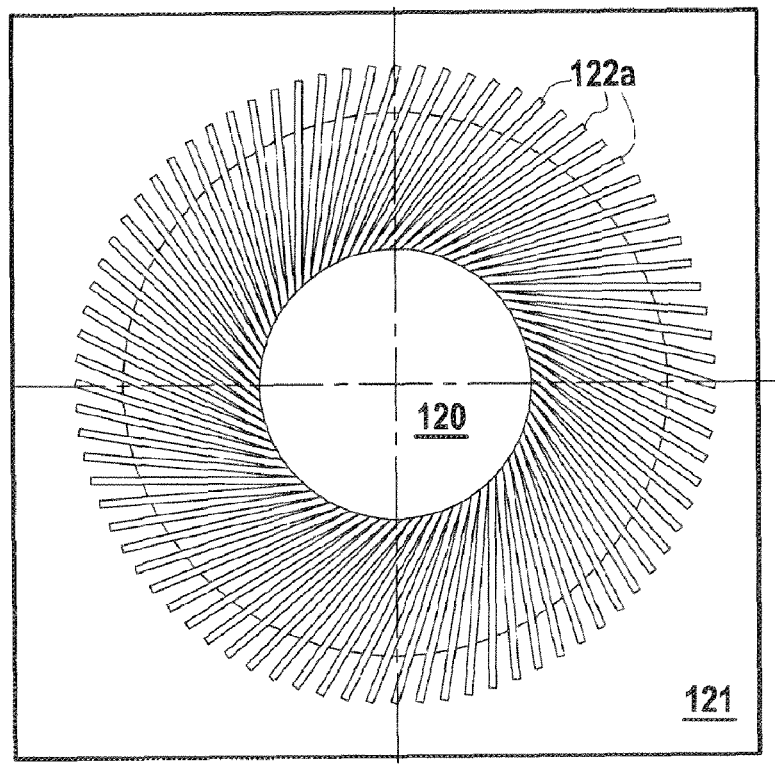
FIGS. 17A, 17B, 18A, 18B, and 19 are diagrammatic views showing a fiber ply being made that has fibers extending in two distinct orientations in accordance with another implementation of the invention.
Figure 17B:
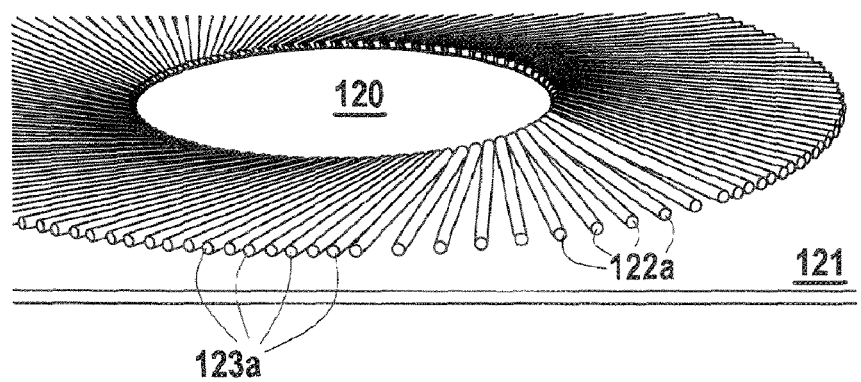

Specifically, as shown in FIG. 17A, the machine places, e.g. in the annular space 123, a first series of fibers 122a at the angle α. As for the fiber layer 30 described above, the gaps that remain between the fibers 122a can be filled in by using the embroidery machine to put additional fibers 123a into place in these gaps (FIG. 17B), with the machine securing these additional fibers to the adjacent fibers by stitching. The density of fibers is then substantially constant at all points.

Figure 18A:
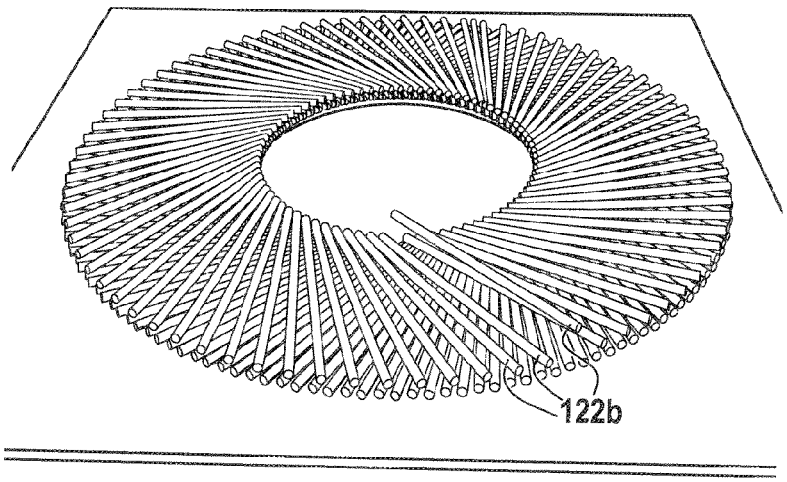
Figure 18B:
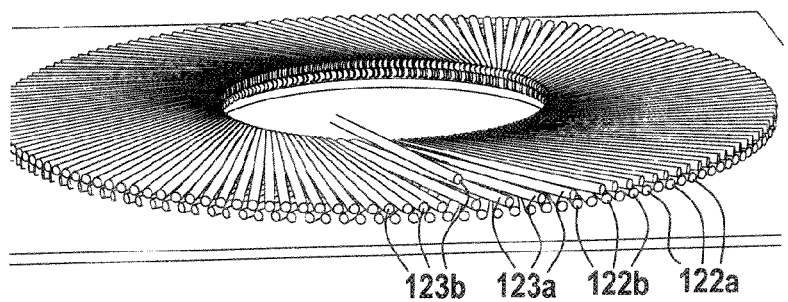

As shown in FIG. 18A, the embroidery machine then places a series of fibers 122b at the angle −α on the series of fibers 122a and 123a. Additional fibers 123b are then added to fill in the gaps present between the fibers 122b (FIG. 18B).

These steps are optionally repeated to form a plurality of superposed series of fibers that are disposed respectively at the angle −α and at the angle α.

Figure 19:
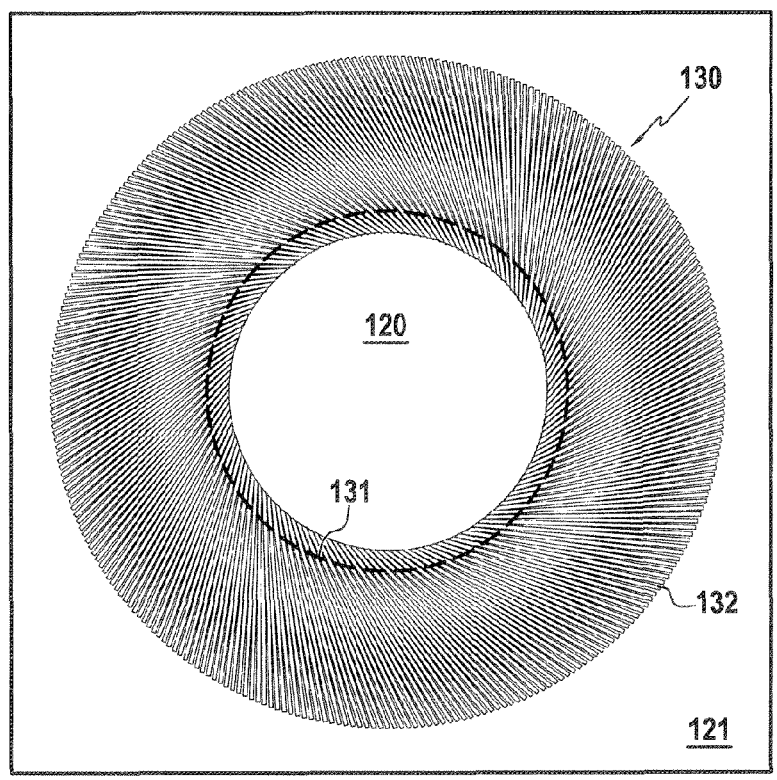

After performing circular stitching 131 in the vicinity of the inner periphery of the annular space and cutting out the portion situation between the two canvases, a fiber ply 130 is then obtained (FIG. 19) having fibers 132 that are held to one another by the circular stitching while retaining a high degree of flexibility, thus making them easy to position on a tool or in a mold presenting the shape of a body of revolution with a non-developable surface.

The fiber reinforcement and the part that is to be made may be constituted by a single ply 130 or by a stack comprising a plurality of such plies, each made from two canvases, as described above. With a stack, the fiber plies 130 may be bonded to one another by a yarn passing through the layers in the thickness direction (Z direction), as for the connection made between the plies 30 and 50 in FIG. 13.

Figure 20:
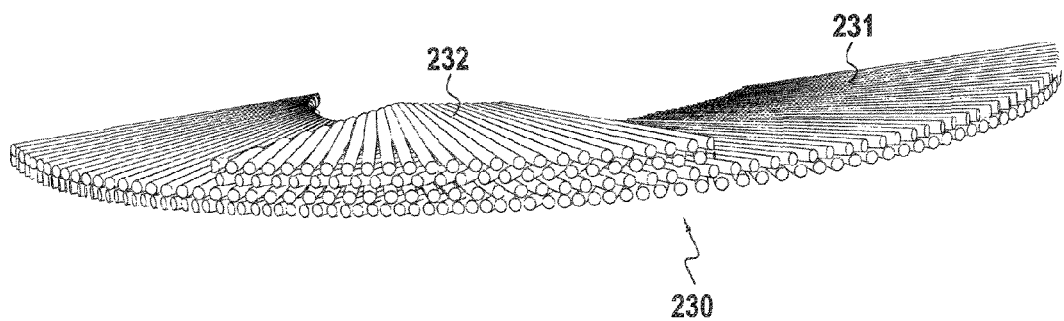
FIG. 20 is a diagrammatic perspective view of a fiber layer including reinforcing portions in accordance with yet another implementation of the invention.

In a particular aspect of the invention, it is possible to form fiber plies having zones of increased thickness so as to form local reinforcements in the final part. FIG. 20 shows a fiber ply 230 comprising a fiber ply 231 made up of two series of fibers oriented respectively at angles α and −α, as described above. The fiber ply 231 also includes a portion 232 made by repeatedly superposing stitched fibers. The portion 232 is made by programming the automatic embroidery machine so that it acts, in a determined zone, to repeatedly put into place and stitch additional fibers so as to create one or more portions of increased thickness on the fiber ply. This produces fiber plies that locally include one or more thickened portions serving to fabricate parts in the form of bodies of revolution and including reinforced portions.

Once the fiber reinforcement has been made using one or more fiber layers 130 and optionally including reinforcing portions 232, the part is molded by impregnating the reinforcement with a thermosetting resin that is polymerized by heat treatment. As in fabricating the strength member for the flexible abutment as described above, the well-known resin transfer molding (RTM) method is used. In this method the fiber reinforcement is placed in a preferably metal mold and then a thermosetting resin is injected therein under pressure. By way of example, the resin may be a cyanate ester resin of temperature class 250° C. (the maximum temperature that can be withstood by the resin without loss of characteristics). Resins suitable for the RTM method are well known. They preferably present low viscosity so as to facilitate injection amongst the fibers. The choice of treatment class and/or chemical nature for the resin is determined as a function of the thermomechanical stresses to which the part is to be subjected. Once the resin has been injected throughout the reinforcement, it is polymerized by heat treatment in accordance with the RTM method.

After injection and polymerization, the part is unmolded. It may optionally be subjected to a post-baking cycle in order to improve its thermomechanical characteristics (increase its glass transition temperature). Thereafter, the part is trimmed to remove excess resin and it has chamfers machined therein. No other machining is needed since, given that it is a molded part, it complies with the required dimensions.

The invention claimed is:

1. A method of making a fiber ply for forming a preform of a composite part in the form of a body of revolution having a non-developable surface, the method comprising the steps of:
    defining an annular space with first and second canvases respectively defining an inner periphery and an outer periphery thereof;
    placing fibers between the canvases by placing the fibers in the annular space in at least one direction and by holding said fibers on the canvases by stitching;
    implementing circular connection stitching in the vicinity of the inner periphery of the annular space; and
    cutting out the fiber ply as made in this way in the annular space in order to extract it from the canvases.

2. A method according to claim 1, characterized in that additional fibers are added to fill in the empty gaps present between the fibers placed between the two canvases, the additional fibers being secured to the adjacent fibers by stitching.

3. A method according to claim 2, characterized in that:
    the fibers are carbon fibers or glass fibers; and
    the fibers are put into place and stitched by an automatic embroidery machine.

4. A method of fabricating fiber reinforcement for a composite strength member of a flexible abutment, the method comprising forming a preform by alternating at least two fiber plies and being characterized in that the first ply is made in accordance with the method according to claim 3, and in that:
    the second ply is made by placing on the first ply, while held in shape on a spherical tool, a ply of fibers that are oriented perpendicularly to the fibers of the first ply;
    the second ply is made by filamentary winding on the first ply; and
    the plies of fiber reinforcement are bonded together by threads.

5. A method of fabricating a strength member for a flexible abutment, the method being characterized in that it comprises fabricating fiber reinforcement in accordance with the method according to claim 4, and in that:
    the fiber reinforcement is placed in a mold into which a thermosetting resin is injected under pressure, the resin subsequently be polymerized by heat treatment and
    the resin is an epoxy resin.

6. A method of fabricating a flexible abutment made up of a laminated structure comprising a plurality of rigid strength members interleaved with layers of elastically deformable material, the method being characterized in that:
    each strength member is made in accordance with the method according to claim 5;
    the layers of elastic material are made up of elastomer or of rubber; and
    the laminated structure is subjected to heat treatment to vulcanize the elastomer or the rubber.

7. A method according to claim 6, characterized in that the layers of elastic material are made of elastomer and in that the laminated structure is subjected to heat treatment to vulcanize the elastomer.

8. A method of fabricating a flexible abutment made up of a laminated structure comprising a plurality of rigid strength members interleaved with layers of elastically deformable material, the method comprising the steps of:
- making a plurality of fiber reinforcements of increasing size in application of the method according to any one of claim 4;
- maintaining the reinforcements one within another by means of spacers between adjacent strength members, said spacers defining the thicknesses of the layers of elastically deformable material;
- injecting a thermosetting resin under pressure into the reinforcements;
- applying heat treatment to polymerize the resin in each reinforcement so as to form a plurality of rigid composite strength members;
- removing the spacers; and
- injecting or casting an elastic material into the spaces present between the rigid composite strength members in order to form layers of elastic material between them.

9. A method of fabricating a composite part of the casing type, the method comprising making at least one fiber ply according to claim 8, and forming a fiber reinforcement by adding fibers to the at least one fiber ply such that the added fibers are oriented in a different direction than the fibers in the at least one fiber ply, wherein
- one or more thickener portions are formed at determined locations on each fiber ply, said portions being made by repeatedly placing fibers at determined locations on the at least one fiber ply;
- the reinforcement is placed in a mold into which a thermosetting resin is injected, the resin subsequently being polymerized by heat treatment; and
- the resin is a cyanate-ester resin.

10. A method according to claim 1, characterized in that the fibers are carbon fibers or glass fibers.

11. A method according to claim 1, characterized in that the fibers are put into place and stitched by an automatic embroidery machine.

12. A method of fabricating fiber reinforcement for a composite strength member of a flexible abutment, the method comprising forming a preform by
- defining an annular space with first and second canvases respectively defining an inner periphery and an outer periphery thereof;
- placing fibers between the canvases by placing the fibers in the annular space in at least one direction and by holding said fibers on the canvases by stitching;
- implementing circular connection stitching in the vicinity of the inner periphery of the annular space;
- cutting out the fiber ply as made in this way in the annular space in order to extract it from the canvases to create a first fiber ply; and
- forming a second fiber ply by placing on the first fiber ply, while held in shape on a spherical tool, a ply of fibers that are oriented perpendicularly to the fibers of the first ply.

13. A method according to claim 12, characterized in that the second ply is made by filamentary winding on the first ply.

14. A method according to claim 12, characterized in that the plies of fiber reinforcement are bonded together by threads.

15. A method of fabricating a strength member for a flexible abutment, the method being characterized in that it comprises fabricating fiber reinforcement in accordance with the method according to claim 12, and in that the fiber reinforcement is placed in a mold into which a thermosetting resin is injected under pressure, the resin subsequently be polymerized by heat treatment.

16. A method according to claim 15, characterized in that the resin is an epoxy resin.

17. The method according to claim 15 wherein a plurality of said strength members are interleaved with layers of elastically deformable material to form a laminated structure for a flexible abutment.

18. A method according to claim 17, characterized in that the layers of elastic material are made up of elastomer or of rubber, and in that the laminated structure is subjected to heat treatment to vulcanize the elastomer or the rubber.

19. A method according to claim 17, characterized in that the layers of elastic material are made of elastomer and in that the laminated structure is subjected to heat treatment to vulcanize the elastomer.

20. A method of fabricating a flexible abutment made up of a laminated structure comprising a plurality of rigid strength members interleaved with layers of elastically deformable material, the method comprising the steps of:
- making a plurality of fiber reinforcements of increasing size in application of the method according to claim 12;
- maintaining the reinforcements one within another by means of spacers between adjacent strength members, said spacers defining the thicknesses of the layers of elastically deformable material;
- injecting a thermosetting resin under pressure into the reinforcements;
- applying heat treatment to polymerize the resin in each reinforcement so as to form a plurality of rigid composite strength members;
- removing the spacers; and
- injecting or casting an elastic material into the spaces present between the rigid composite strength members in order to form layers of elastic material between them.

21. A method of fabricating a composite part of the casing type, the method comprising making at least one fiber ply according to claim 20, and forming a fiber reinforcement by adding fibers to the at least one fiber ply such that the added fibers are oriented in a different direction than the fibers in the at least one fiber ply.

22. A method according to claim 21, characterized in that one or more thickener portions are formed at determined locations on each fiber ply, said portions being made by repeatedly placing fibers at determined locations on the ply.

23. A method according to claim 21, characterized in that the reinforcement is placed in a mold into which a thermosetting resin is injected, the resin subsequently being polymerized by heat treatment.

24. A method according to claim 23, characterized in that the resin is a cyanate-ester resin.

* * * * *

UNITED STATES PATENT AND TRADEMARK OFFICE
CERTIFICATE OF CORRECTION

PATENT NO. : 8,034,273 B2
APPLICATION NO. : 12/298249
DATED : October 11, 2011
INVENTOR(S) : Joelle Lalande et al.

Page 1 of 1

It is certified that error appears in the above-identified patent and that said Letters Patent is hereby corrected as shown below:

Column 5, line 52, "1" should read -- $\ell$ --; and

Column 6, line 46, "strip 44" should read -- strip 42 --.

Signed and Sealed this
Twelfth Day of March, 2013

Teresa Stanek Rea
*Acting Director of the United States Patent and Trademark Office*